(12) United States Patent
Haagenson et al.

(10) Patent No.: US 11,360,283 B1
(45) Date of Patent: Jun. 14, 2022

(54) VOLUME DONATING COMPRESSIBLE FILLER SYSTEM AND METHOD

(71) Applicants: Steven Haagenson, Fairbanks, AK (US); John Huber, Jr., Delta Junction, AK (US)

(72) Inventors: Steven Haagenson, Fairbanks, AK (US); John Huber, Jr., Delta Junction, AK (US)

( * ) Notice: Subject to any disclaimer, the term of this patent is extended or adjusted under 35 U.S.C. 154(b) by 0 days.

(21) Appl. No.: 17/320,337

(22) Filed: May 14, 2021

(51) Int. Cl.
*G02B 6/44* (2006.01)
*G02B 6/50* (2006.01)
*H02G 1/08* (2006.01)
*H01B 9/00* (2006.01)
*H02G 9/06* (2006.01)

(52) U.S. Cl.
CPC ........... *G02B 6/4465* (2013.01); *G02B 6/504* (2013.01); *H01B 9/003* (2013.01); *H01B 9/005* (2013.01); *H02G 1/081* (2013.01); *H02G 9/06* (2013.01)

(58) Field of Classification Search
CPC ..... G02B 6/504; G02B 6/4465; G02B 6/4496
See application file for complete search history.

(56) References Cited

U.S. PATENT DOCUMENTS

| | | |
|---|---|---|
| 1,801,500 A | 4/1931 | Gottwald |
| 1,802,657 A | 4/1931 | Kellems |
| 3,120,947 A | 2/1964 | Hamrick |
| 3,122,806 A | 3/1964 | Lewis |
| 3,244,402 A | 4/1966 | Ensley |
| 3,473,339 A | 10/1969 | Schlafly, Jr. |
| 3,672,006 A | 6/1972 | Fidrych |
| 4,368,910 A | 1/1983 | Fidrych |
| 4,443,019 A | 4/1984 | Ishido et al. |
| 4,534,163 A * | 8/1985 | Schuerch ................ D07B 1/04 57/233 |
| 4,593,599 A | 6/1986 | Yeardley |
| 4,601,507 A | 7/1986 | Fallon |
| 5,172,730 A | 2/1992 | Driver |
| 5,092,375 A | 3/1992 | Landers |
| 5,157,752 A | 10/1992 | Greveling |
| 5,740,295 A | 4/1998 | Kinard |
| 6,085,628 A | 7/2000 | Street et al. |
| 6,464,229 B1 | 10/2002 | Kogler et al. |
| 7,515,795 B2 | 4/2009 | Overton et al. |

(Continued)

FOREIGN PATENT DOCUMENTS

| | | | |
|---|---|---|---|
| CN | 107045900 A | * | 8/2017 |
| JP | 2006050713 A | * | 2/2006 |

*Primary Examiner* — Charlie Y Peng
(74) *Attorney, Agent, or Firm* — Brian S. Steinberger; Hilary F. Steinberger; Law Offices of Brian S. Steinberger, P.A.

(57) ABSTRACT

Devices, systems and methods to prevent damage to power and communication conductors located in cold occurring regions, with an elongated cylindrical tubular assembly of closed cell foam within a braided/woven layer that can be sealed to provide longitudinal strength and a snag resistant durable and flexible outer coating. The assembly along with communication and power lines is pulled through new power and communication ducts and conduits and in retro-fitting existing power and communication ducts, so that the assembly reduces the volume spacing in the ducts/conduits that can be damaged by water intrusion which expands during freeze conditions.

14 Claims, 9 Drawing Sheets

(56) References Cited

U.S. PATENT DOCUMENTS

| | | |
|---|---|---|
| 7,650,911 B2 | 1/2010 | Follett et al. |
| 7,991,256 B2 * | 8/2011 | Griffioen ............... G02B 6/4496 |
| | | 385/109 |
| 8,197,074 B2 | 6/2012 | Hurwitz |
| 9,273,816 B2 | 3/2016 | Emerson et al. |
| 9,733,446 B1 | 8/2017 | Haagenson et al. |
| 2004/0255435 A1 * | 12/2004 | Barger .................... F16L 3/233 |
| | | 24/306 |
| 2007/0297730 A1 | 12/2007 | Bringuier |

* cited by examiner

FIG. 3
FIG. 4
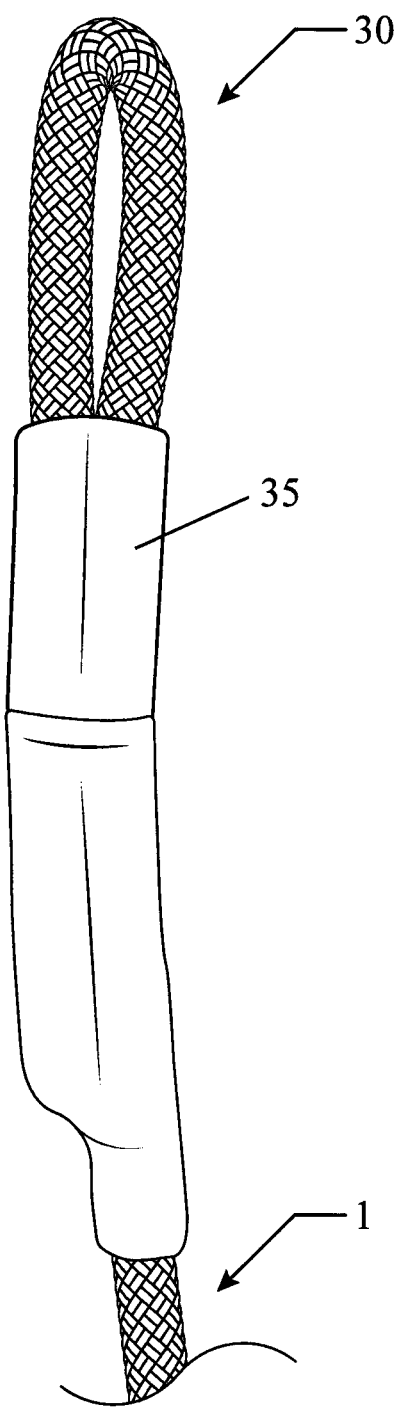
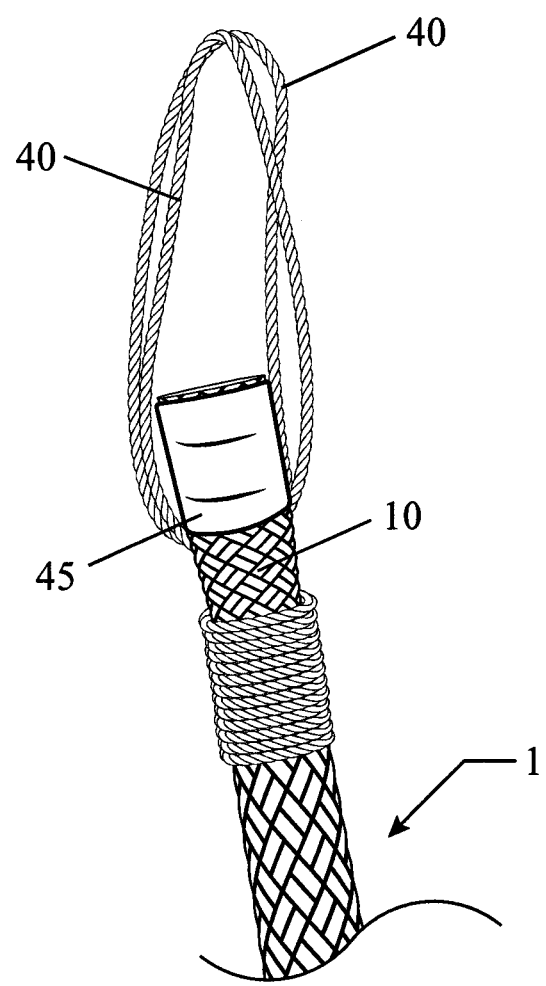

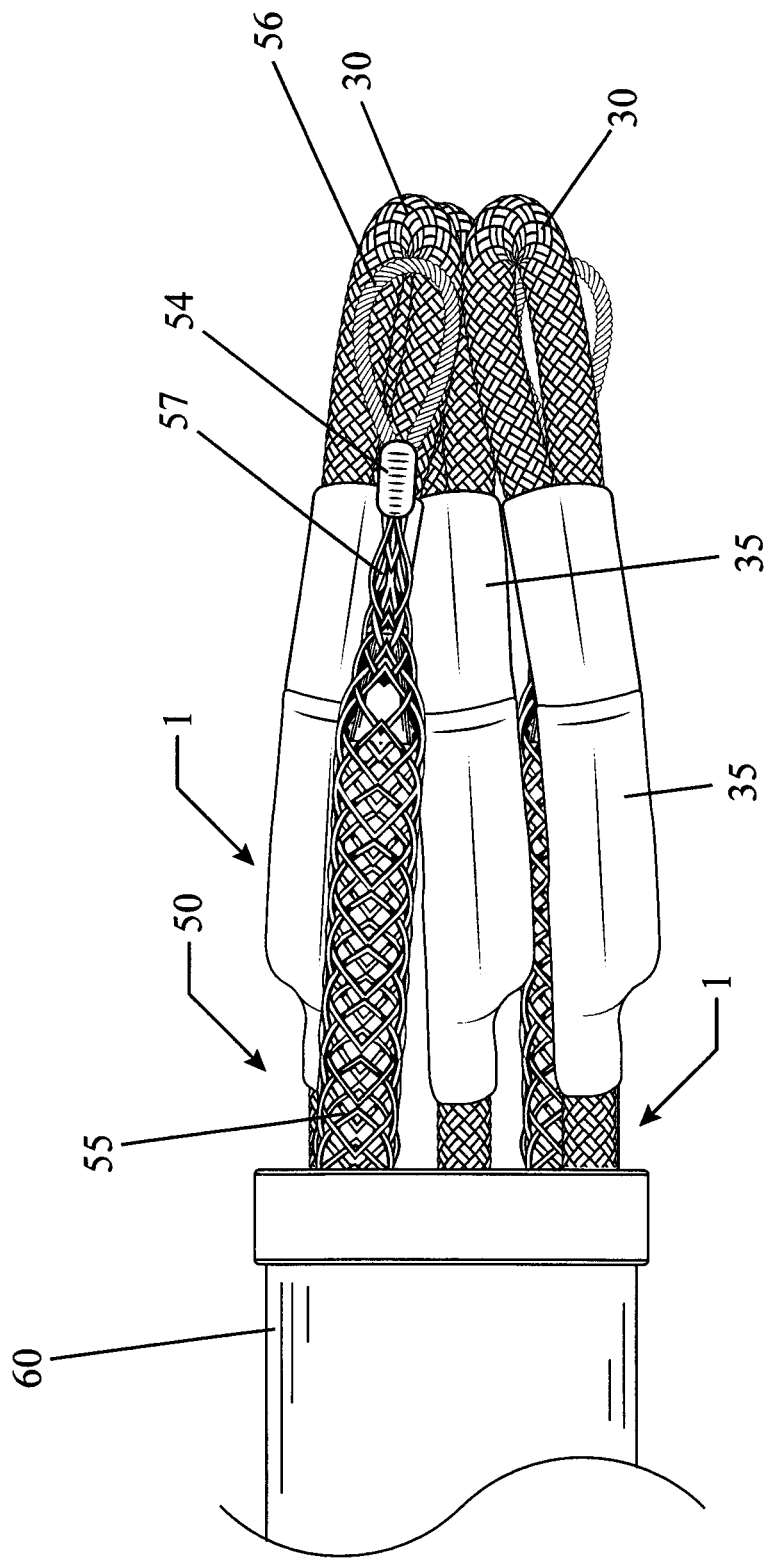

W = WATER IN DUCT

FW = FROZEN WATER IN DUCT (ICE)

VOLUME DONATING COMPRESSIBLE FILLER SYSTEM AND METHOD

FIELD OF INVENTION

This invention relates to freeze damage protection of power and communication ducts and conduits, and in particular to devices, systems and methods to prevent damage to power and communication conductors located in cold occurring regions, with an elongated cylindrical tubular assembly of an elongated cylindrical tubular assembly of closed cell foam within a braided or woven layer that can be sealed to provide longitudinal strength and a snag resistant durable and flexible outer coating, along with communication and power lines which are both pulled through new ducts and conduits, in order to reduce the volume spacing in the ducts/conduits that can be damaged by water intrusion which expands during freeze conditions wherein the assembly is pulled through new power and communication ducts and conduits and in retrofitting existing power and communication ducts, wherein the assembly reduces the volume spacing in the ducts/conduits that can be damaged by water intrusion which expands during freeze conditions.

BACKGROUND AND PRIOR ART

Pressures exerted by the expansion of freezing water within duct or conduit installations and their associated vaults or enclosures can be extreme. These pressures have been calculated to reach upward of 60,000 psi, which is Utilities in northern temperate, sub-arctic and arctic regions such as the northern contiguous United States, Canada and Alaska (and other similar regions worldwide) have tried for many years to devise techniques to prevent damage to power and communication conductors and equipment that are installed within duct/vault systems.

Generally, conductors are installed in conduits or duct systems for mechanical protection from the environment. Ducts and conduits allow for possible replacement after a conductor failure when the ground is frozen or without disturbing the surface area above the duct or conduit. Conductors installed in underground ducts are generally classified as being installed in wet locations. However, electrical rigid metal conduits do not have tapered threads and when installed, are not watertight.

While the air pressure within installed conduits and ducts is basically 0 psi gauge, ground water pressure is always higher. Water will force in through couplings, expansion joints or other duct connections. Water also enters ducts, vaults or enclosures by infiltration or flooding from the surface or will flood in or infiltrate through the open conduit ends. Once in the conduit or duct system, water fills the voids between the conductors within the conduit.

During winter months surrounding ground freezes down to or beyond a depth of 6 to 7 feet depending upon geographic location. Conduits are typically placed from 24 to 42 inches below grade, which is well within the freeze depth. As the ground freezes around the conduit, it forms a layer of frozen soil around the conduit that can approach the strength of concrete. As the ground continues to freeze, the water at the ends and inside the conduit also starts to freeze, capturing liquid water in the conduit.

As water continues to freeze in these confined spaces, the pressure increases due to the expansion of water as it changes to ice. If the conduit/duct is above ground, the conduit will rupture from the high pressure. When the conduit is in frozen ground the strength of the conduit is greatly increased by the surrounding frozen earth which allows the pressure inside the conduit to reach extremely high pressures. As these high pressures increase, the pressure is applied to the conductors, which causes deformation and failure of the conductor insulation. Driven by increasing pressure, expanding ice (which is bonded to the conductor insulation) attempts to flow along the duct or conduit seeking the necessary volume dictated by its change of state from water to ice. At typical pressure, that necessary additional volume can only be found at the conduit or duct ends of the installed system, which results in insulation and/or conductor failure.

Some techniques have been attempted to protect conductors in conduits or ducts located within frozen ground or free air from damage caused by the expanding frozen water. These techniques range from keeping the water out, using heat and other chemicals, and displacing the water with another material. Attempting to keep the water out is commonly called the submarine approach. Keeping water out of a conduit system can be extremely difficult unless all water entry points are sealed and continuous maintenance methods are strictly assured and enforced. However, couplings on rigid metal conduits are not sealed and allow water entry from the elevated water pressure that exists around a buried conduit.

Additionally, above ground ducts/conduit systems also tend to retain all infiltrated water. The most common way to avoid standing water in conduits is grading, where the conduit is sloped to a drain point. However, in areas of high water table, the drain point allows water to flow back in the conduit/duct from the intended drain point. The layout of the conduit/duct can also interfere with draining when there are elbows or fittings that are intended to provide a continuous enclosed path from buried depth to the surface. Additionally, storming conditions or flooding can allow water to enter conduits/ducts from their end points.

Keeping the water out through the use of heat or chemicals is also not practical and does not work. Heat and chemicals are expensive and often impractical or wasteful. Chemicals can be added to the conduit to suppress the freezing point of the water, similar to anti-freeze. However, chemicals must be approved for use with the conductor insulation and monitored against dilution over time must be assured. Further, with heated ducts/conduits temperatures must be controlled and monitored to prevent insulation damage and allow the full capacity of the conductor to be achieved.

Displacing the freezing water with another material, such as expanded or blown in beaded foam, has been tried. Expanding foam tends to expand around the conductors and will prevent the change out of the conductor following a failure. Beaded foam will displace the water but will not withstand flowing water which can occur in a conduit/duct.

The subject coinventors are the inventors of patent application Ser. No. 15/160,344 filed May 20, 2016, titled: FREEZE PROTECTION THROUGH VOLUME DONATION, which issued as U.S. Pat. No. 9,733,446 on Aug. 15, 2017, which is incorporated by reference in its' entirety.

U.S. Pat. No. 9,733,446 required the use of a pull cord through the middle of an elongated foam core. Molding a foam core about a pull cord line is difficult and expensive to manufacture, and further difficult to use in the field.

Thus, the need exists for solutions to the above problems with the prior art.

SUMMARY OF THE INVENTION

A primary objective of the present invention is to provide devices, systems and methods to prevent damage to power and communication conductors located in cold occurring regions, with an elongated cylindrical tubular assembly of closed cell foam within a braided or woven layer that can be sealed to provide longitudinal strength and a snag resistant durable and flexible outer coating along with communication and power lines which are pulled through new ducts and conduits, in order to reduce the volume spacing in the ducts/conduits that can be damaged by water intrusion which expands during freeze conditions.

A secondary objective of the present invention is to provide devices, systems and methods to prevent damage to power and communication conductors located in cold occurring regions, with an elongated cylindrical tubular assembly of closed cell foam within a braided layer, wherein the assembly along with power and communication lines is pulled through the retrofitting of existing power and communication ducts, so that the assembly reduces the volume spacing in the ducts/conduits that can be damaged by water intrusion which expands during freeze conditions.

A third objective of the present invention is to provide devices, systems and methods to provide a simple and inexpensive method of freeze damage protection and to avoid outages and repair costs as well as reducing the increased costs required for spare or redundant duct additions to assure reliability for power and communication conductors located in cold occurring regions. Increased reliability brings increased health and safety benefits where communication infrastructure failures can isolate and delay emergency responders. In extreme cold seasons power infrastructure failures can interrupt heat sources that can lead to a freeze up of a home within eight hours, or disrupt businesses, traffic control lights and other processes that rely on a reliable electric supply.

A system for preventing freeze damage in power and communication ducts and conduits, can include at least one an elongated cylindrical tubular assembly of closed cell foam within a braided layer and can include a pull eye at one or both ends, adjacent to at least one conductive cable within a sleeve with a pull end, and a cable puller for pulling the ends of both the at least one elongated closed cell foam core within a braided layer, and at least one conductive cable within a sleeve through conduit, wherein at least one elongated closed cell foam within an elongated cylindrical tubular assembly of closed cell foam within a braided layer reduces volume spacing in the conduit that is subject to being damaged by water intrusion which expands during freeze conditions.

The conduit can be a new communication and power conduit to be installed in regions subject to freeze conditions.

The conduit can be an existing communication and power conduit to be retrofitted in regions subject to freeze conditions.

The conductive cable in the sleeve can include a power cable. The conductive cable in the sleeve can include a communications cable. The conductive cable in the sleeve can include metal conductors. The conductive cable in the sleeve can include optical fibers.

The closed cell foam can include a compressive material within a braided outer layer, and can include an end forming a pull end.

The braided layer can be impregnated with a durable and flexible outer coating can include a non-water absorbing material that bonds with the braid to provide a snag resistant and abrasion resistant outer layer if needed to augment the performance of the core compressible material.

The cable puller can include a pulley.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 3 is a perspective view of a wrapped loop end of the elongated core of closed cell foam within a braided layer which can have a sealer impregnated in the braided layer of FIG. 1, with the wrapped loop end forming a pull end.

FIG. 4 is a perspective view of another pull end formed at one end of the elongated core of closed cell foam within a braided layer which can have a sealer impregnated in the braided layer of FIG. 1.

FIG. 7A is a side perspective view of the VDCF devices and communication/power conductor cables from FIG. 3 with protruding ends protruding out from the conduit/duct of FIG. 6.

DESCRIPTION OF THE PREFERRED EMBODIMENTS

Figure 1:
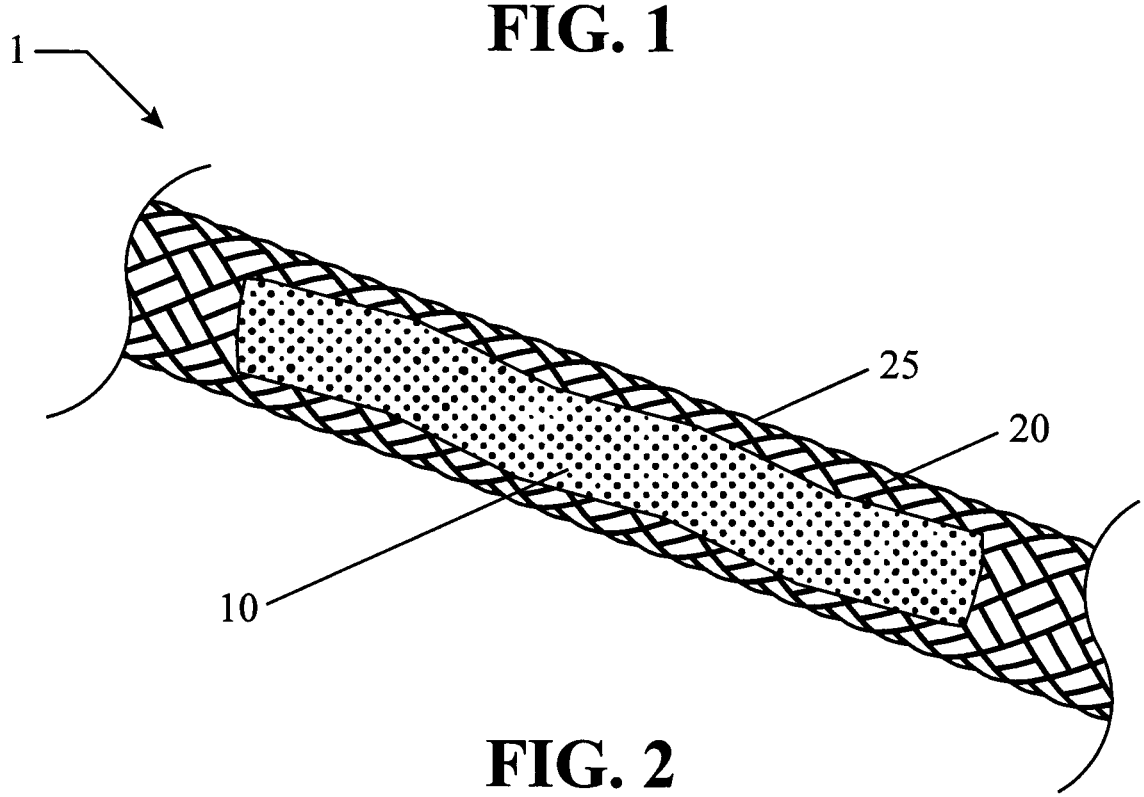
FIG. 1 is a perspective view of a Volume Donating Compressible Filler (VDCF) device of an elongated core of closed cell foam within a braided layer which can have a sealer impregnated in the braided layer, within a partially exposed side.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features.

For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

The subject application is an improvement over the co-inventors' previous patent application Ser. No. 15/160,344 filed May 20, 216, titled: FREEZE PROTECTION THROUGH VOLUME DONATION, which issued as U.S. Pat. No. 9,733,446 on Aug. 15, 2017, which is incorporated by reference in its' entirety.

A list of components will now be described.
1. VDCF device(s)
20 non-conductive durable and flexible braided/woven layer
10 compressible material, such as closed cell foam
25 sealer impregnated in the fibers of the braided/woven layer
30 folded loop end
35 Heat shrink wrap band
40 loop pull ends
45 tape wrap
50 communication/power cables/conductors in cover sleeve
51 conductors, including metal conductors or optical fibers
55 cover sleeve for communication/power cables/conductors
54 clamp on cable pulling grip ends
56 pull line loop (pulling eye)
57 cable pulling grip ends
60 conduit/duct
70 trench
75T thawed backfill
75F frozen backfill
120 pulleys
W water
FW frozen water or ice The invention allows for water to enter and remain within the conduit/duct in the presence of a compressible material originally installed with the conductors The compressible material is sized to provide adequate water-to-ice volume donation within the duct/conduit (approximately 20% to approximately 25% of void space). This volume donation by the inert, non-conductive and compressible material inexpensively provides duct/conduit/vault freeze protection by donating all necessary volume through soft material compression. With the necessary volume donation available, conduit/duct/vault pressure remains static and damage is prevented during the freeze cycle.

In March 2021 a test of VDCF was conducted using three sections 15 kV #1/0 awg aluminum conductor jacketed concentric neutral cables and three sections of 5/8" VDCF installed in a 3" PVC conduit. The samples were cut to match the length of the conduit which had threaded fittings on each end.

One conduit end fitting was installed and the cables and VDCF sections were installed in the conduit. Water was poured around the cable and VDCF until full and the second end cap was installed.

The sample was placed outdoors in below freezing temperatures which ranged from 28° F. to −20° F. for about a month. Placing the cables and VDCF in a sealed conduit provided a valid test of the compressibility of the VDCF and its ability to maintain low hydraulic pressures during the freeze cycle, as the PVC pipe did not rupture. As the ice melted the VDCF rebounded to its original round shape, ready for another cycle.

In the event of a conductor failure in the conduit/duct system, (presumably by other causes not related to freezing) the entire cable assembly including the interstitial compression material can be removed from the conduit and reinstalled without replacement or modification of the conduit/duct system.

Figure 2:
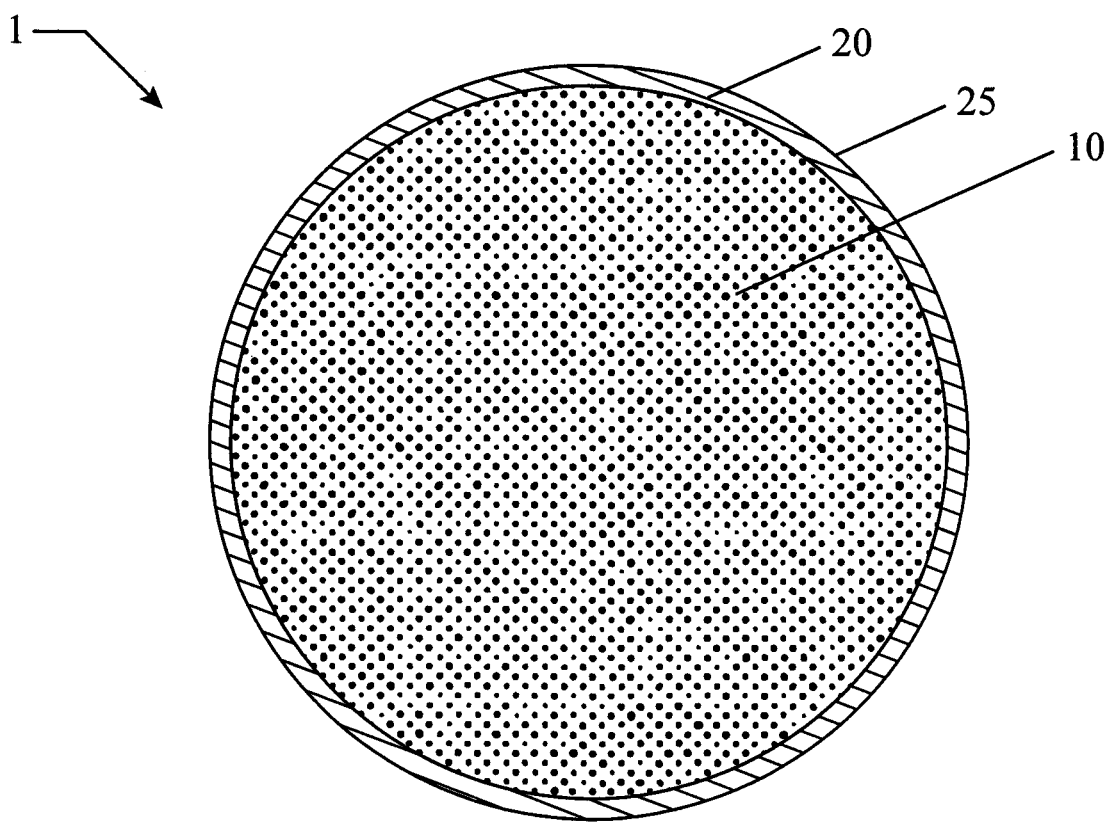
FIG. 2 is a cross-sectional view of the VDCF device of FIG. 1.

FIG. 1 is a perspective view of a Volume Donating Compressible Filler (VDCF) device 1 of an elongated core of closed cell foam 10 within a braided or woven layer 20 and impregnated non-conductive durable and flexible sealer coating 25, within a partially exposed side. FIG. 2 is a cross-sectional view of the VDCF device 1 of FIG. 1.

Referring to FIGS. 1-2, the VDCF device 1 can include an elongated cylindrical tubular assembly of closed cell foam 10 within a braided layer 20 and impregnated non-conductive durable and flexible sealer coating 25.

The braided layer 20 can be formed from polyester strands/threads woven/braided into an exterior layer 20 over a solid elongated foam core of closed cell foam 10. Such a braided layer 20 over a closed cell foam core 10, can include the assemblies shown and described in U.S. Pat. No. 4,593,599 to Yeardley; U.S. Pat. No. 6,085,628 to Street et al.; and U.S. Pat. No. 8,197,074 to Hurwitz, which are each incorporated by reference in their entirety.

FIG. 3 is a perspective view of a wrapped loop end of the VDCF devices 1 that include an elongated core of closed cell foam 10 within a braided layer 20 and impregnated non-conductive durable and flexible sealer coating 25 of FIG. 1-FIG. 2, with the folded end forming a loop end 30 by heat shrink band 35 therein forming a pull end.

FIG. 4 is a perspective view of another pull end 40 formed at one end of the VDCF devices of FIG that include the elongated core of closed cell foam 10 within a braided layer 20 and impregnated non-conductive durable and flexible sealer coating 25 of FIG. 1-FIG. 2. Loop pull ends 40 are attached to ends of the braded/woven layer 10 with a wrapped tape 45.

Wrapped tape 45 refers to a piece of electrical tape that can be used to temporarily hold the stranding in place during the formation of the loops.

Figure 5:
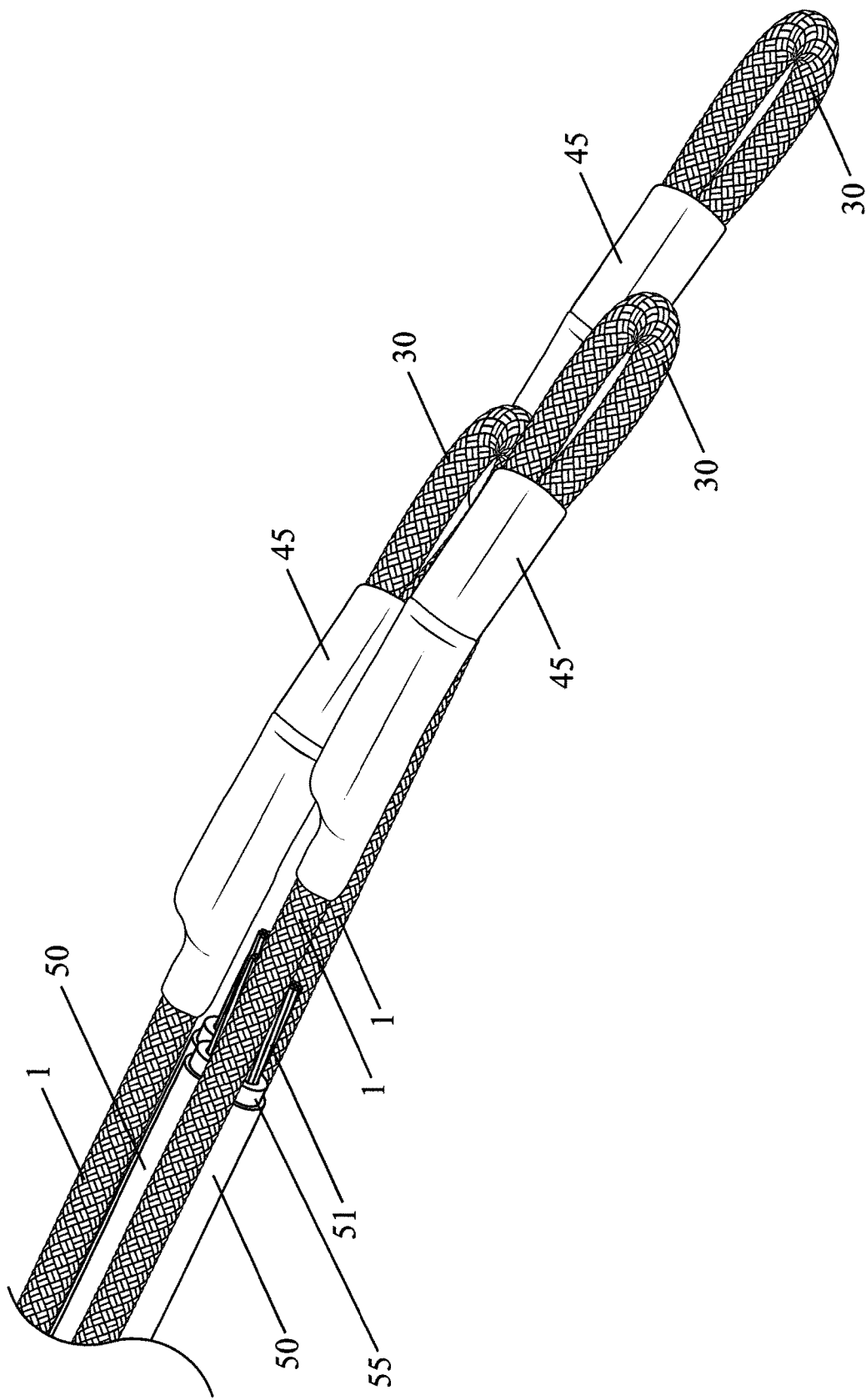
FIG. 5 is a perspective view of plural VDCF devices of FIG. 3 adjacent to either communication or power conductor cables.

FIG. 5 is a perspective view of plural VDCF devices 1 of FIG. 1-2 adjacent to communication and power conductor cables 50. Each communication/power cable 1 can include a cover sleeve 55 about conductors 1, that can include metal conductors, optical fibers, and the like.

Figure 6:
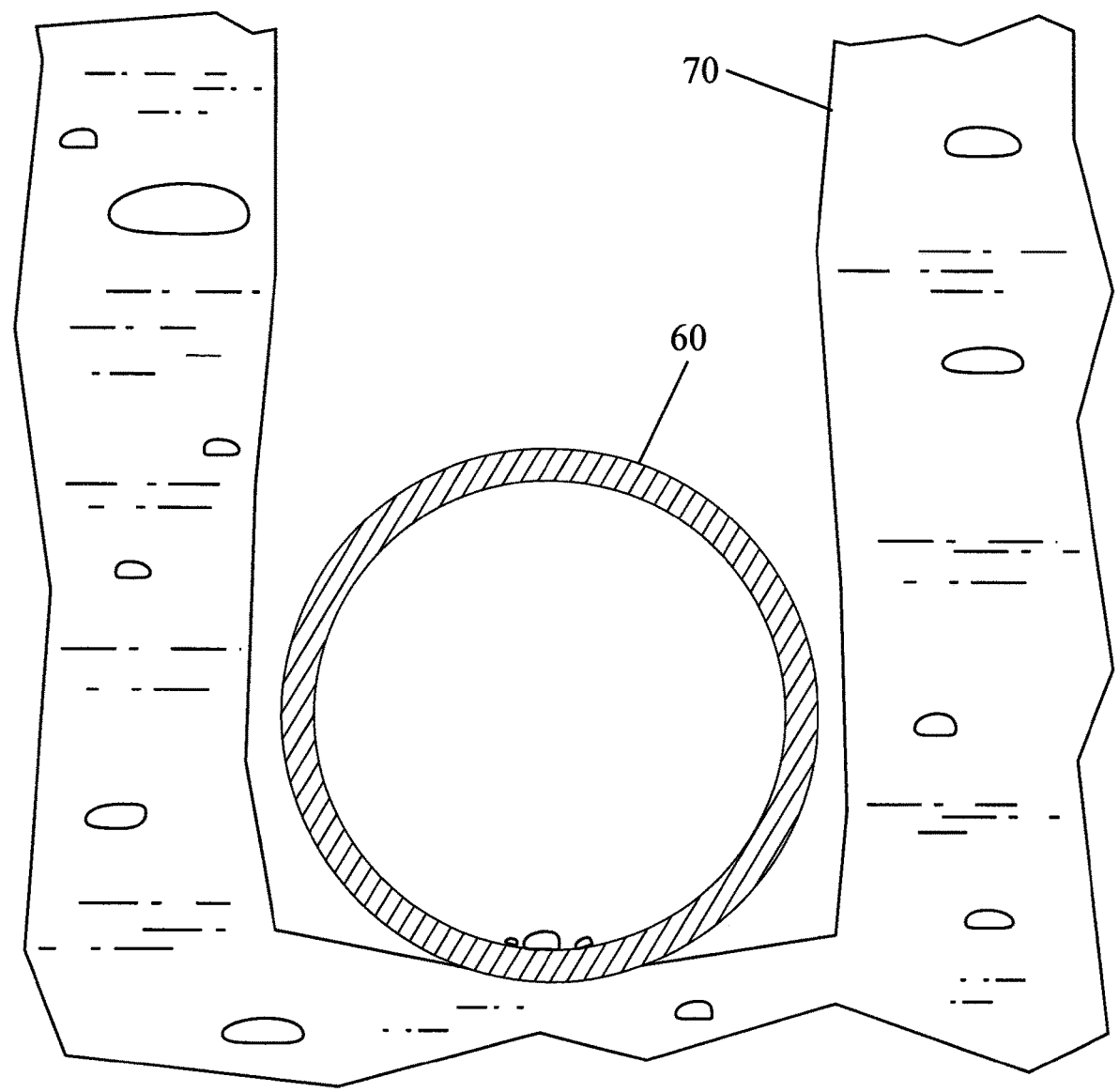
FIG. 6 is a front cutaway view of a conduit/duct at the bottom of a freshly excavated trench.

FIG. 6 is a front cutaway view of a conduit/duct 60 at the bottom of a freshly excavated trench 70.

FIG. 7A is a side perspective view of the VDCF devices 1 and communication/power conductor cables 50 with crimped ends 54 and loop ends 56 protruding out from the conduit/duct 60 of FIG. 6.

Cable 50 can include a jacket 55 about a conductor 51 (not shown) having ends forming cable pulling grip ends 57 that are attached into a clamp 54, having a pull line loop 56 extending therefrom forming a pulling eye. This type of configuration can include cable pulling grips 57, such as those shown and described in U.S. Pat. No. 1,802,657 to Kellems; U.S. Pat. No. 3,122,806 to Lewis; U.S. Pat. No. 3,672,006 to Fidrych; U.S. Pat. No. 4,368,910 to Fidrych; and U.S. Pat. No. 4,601,507 to Fallon, which are all incorporated by reference in their entirety.

While a cable pulling technique is shown in FIG. 7A and described above, other cable pulling techniques can be used.

While a cable pulling technique is shown in FIG. 7A and described above, other cable pulling techniques can be used.

Figure 7B:
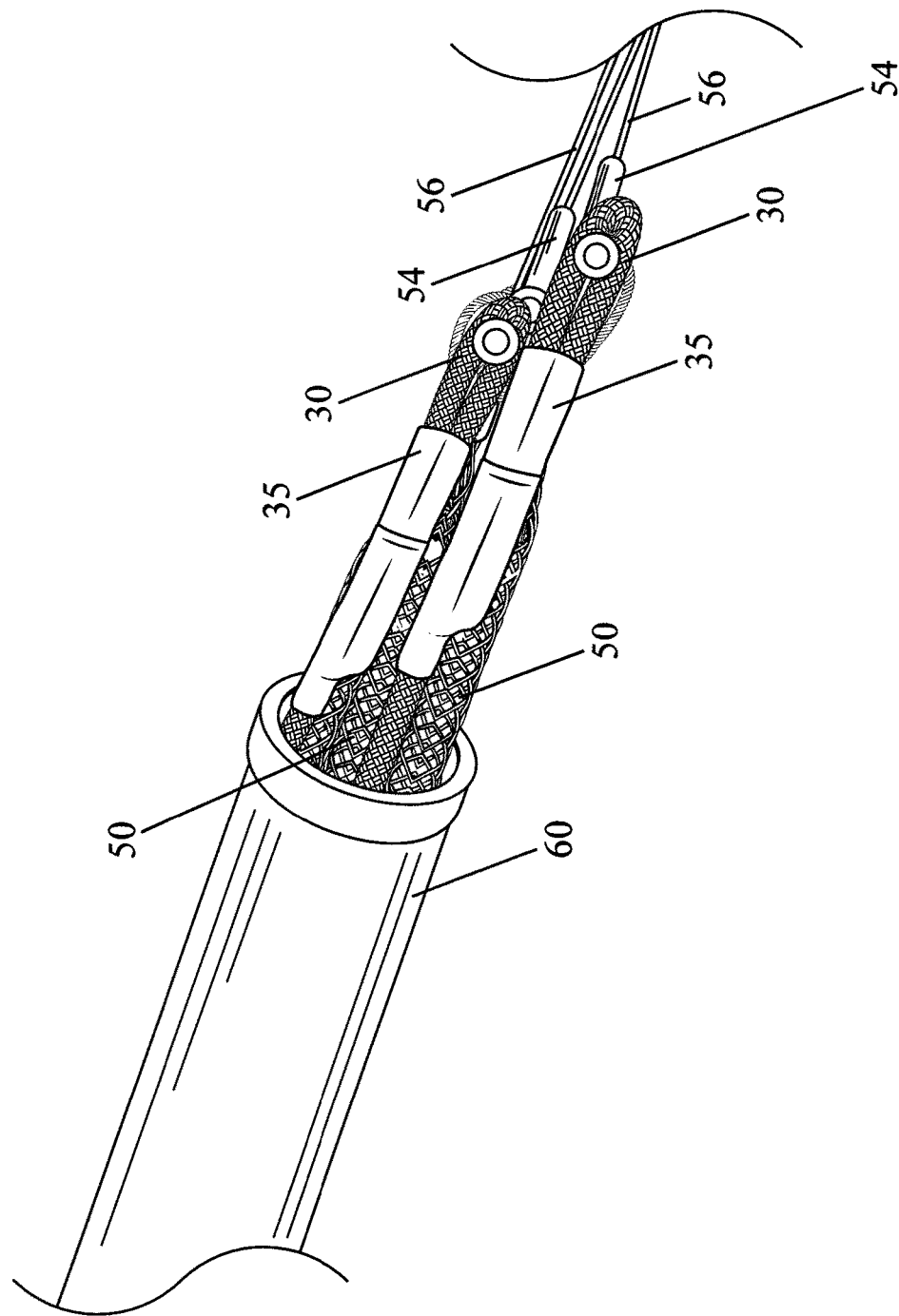
FIG. 7B is another side perspective view of the VDCF devices and communication/power conductor cables from FIG. 3 with protruding ends protruding out from the conduit/duct of FIG. 6.

FIG. 7B is another side perspective view of the VDCF devices 1 and communication/power conductor cables 50 with protruding ends protruding out from the conduit/duct 60 of FIG. 6.

Figure 8:
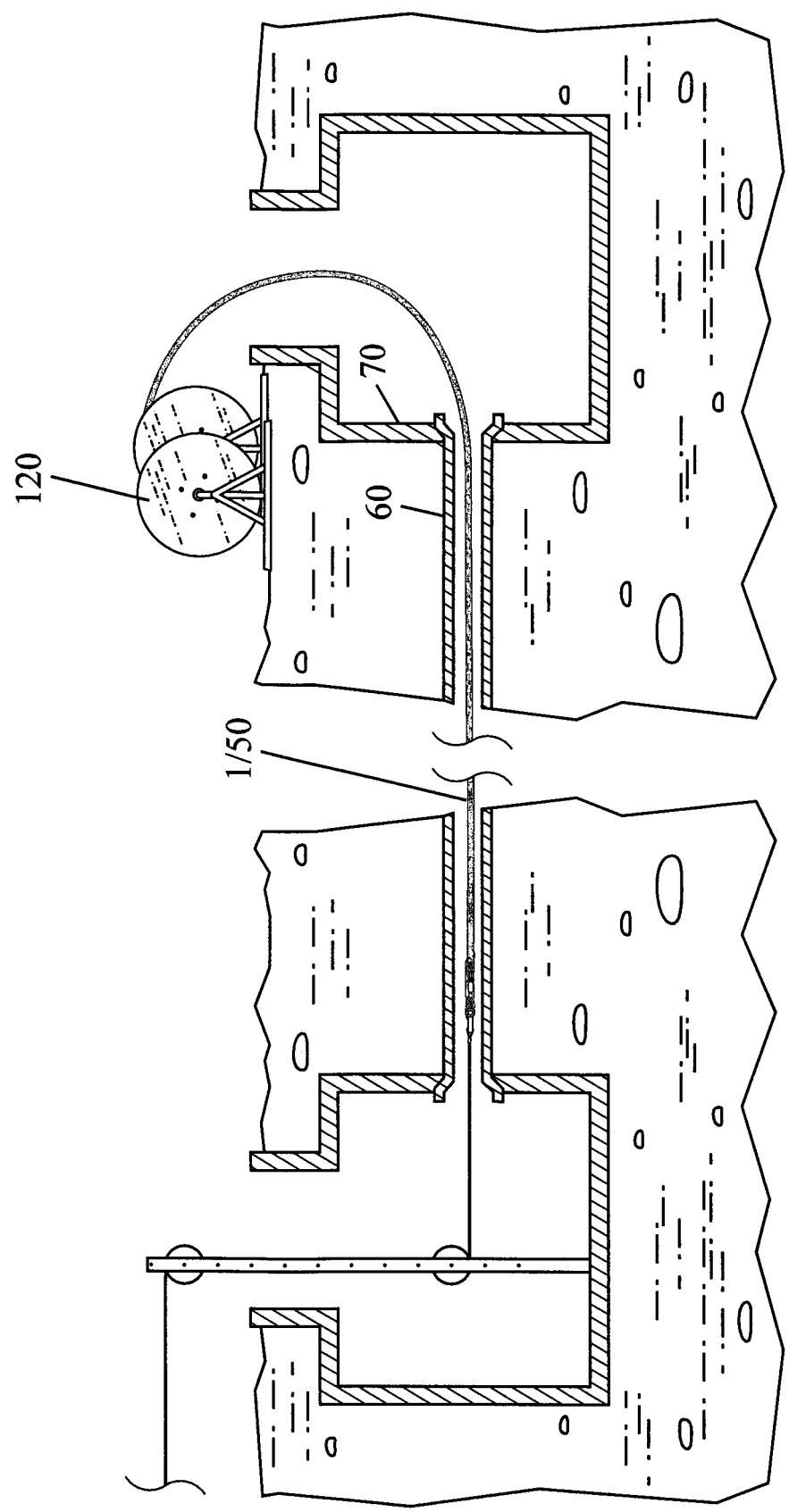
FIG. 8 is a perspective view of the VDCF devices and conductor cables of FIG. 5, 7A, 7B being pulled through the conduit/duct.

FIG. 8 is a perspective view of the VDCF devices 1 and conductor cables 50 of FIG. 5, 7A, 7B being pulled through the conduit/duct 60 by a pulley system 120 that can include mechanical rotatable pulleys and the like.

Figure 9:
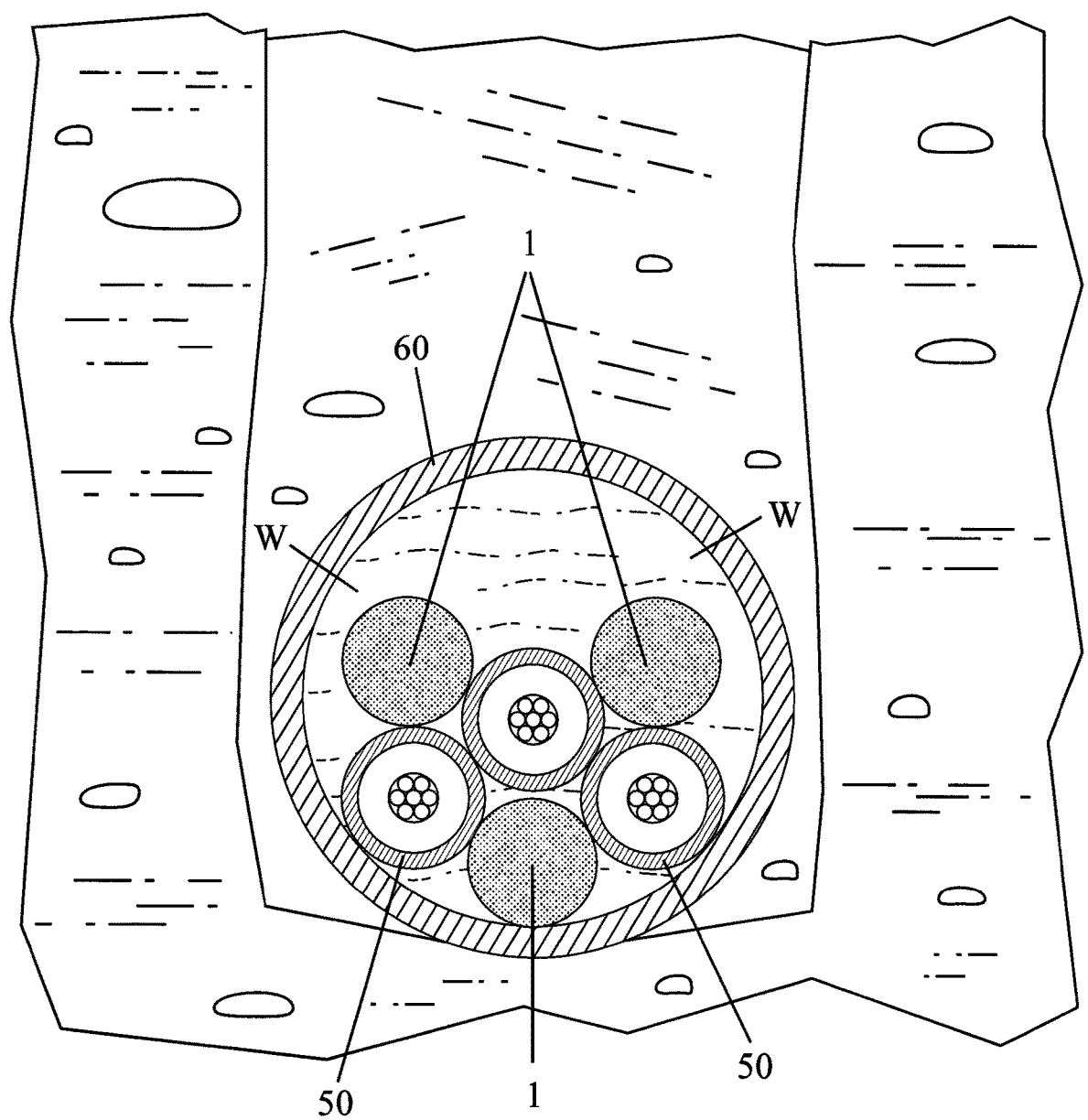
FIG. 9 is cross-sectional view of the installed VDCF devices and communication/power conductor cables installed in the conduit/duct of FIG. 8 surrounded by water inside of the conduit/duct.

FIG. 9 is cross-sectional view of the installed VDCF devices 1 and communication/power conductor cables 50 installed in the conduit/duct of FIG. 8 surrounded by water W inside of the conduit/duct 60.

Figure 10:
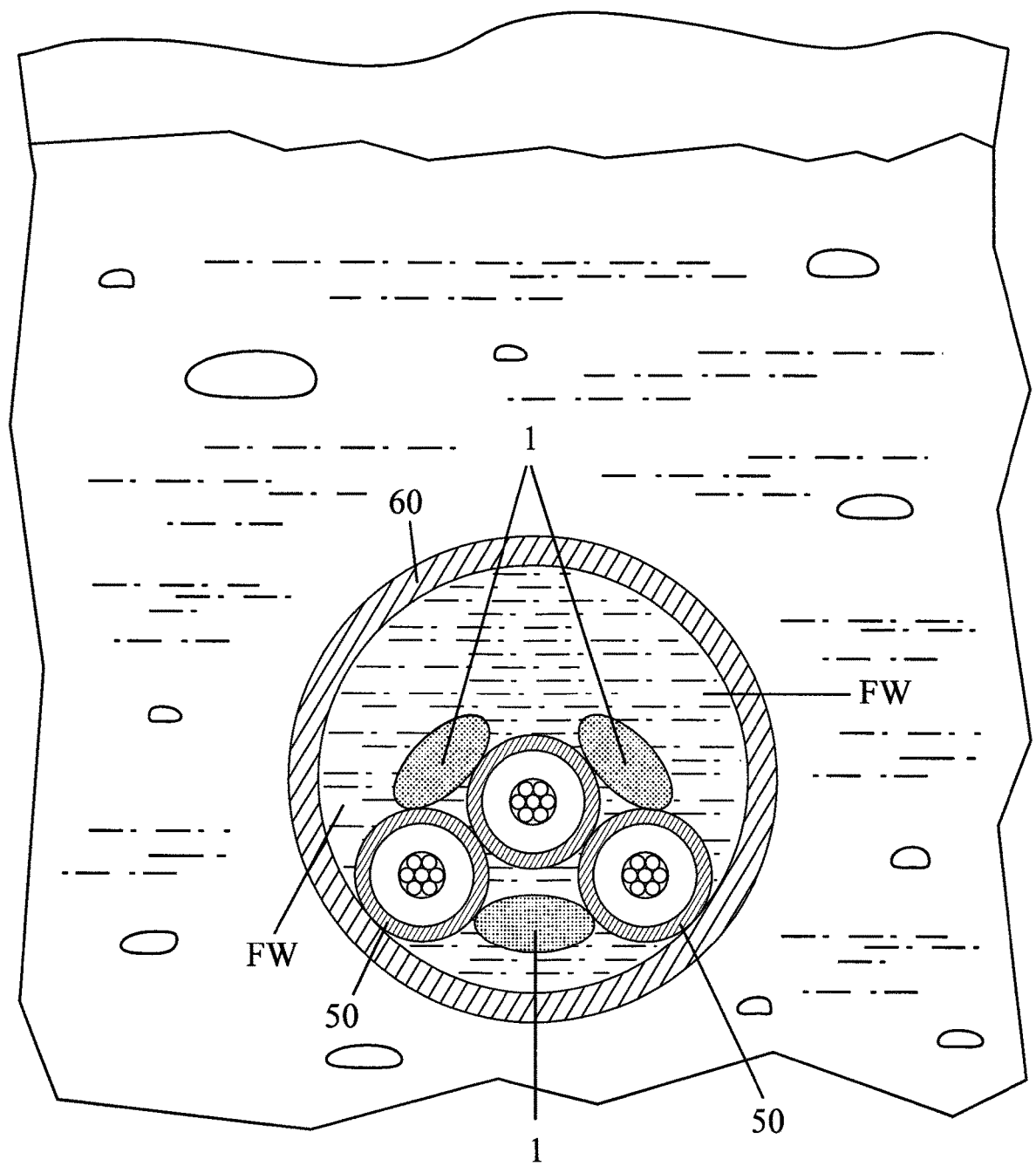
FIG. 10 is another cross-sectional view of the installed VDCF devices and communication/power conductor cables installed in the conduit/duct of FIG. 8 with water in and around the conduit/duct that is now frozen to expand against and compress the VDCF devices.

FIG. 10 is another cross-sectional view of the installed VDCF devices 1 and communication/power conductor cables 50 installed in the conduit/duct 60 of FIG. 8 with water in and around the conduit/duct hat is now frozen FW to expand against and compress the VDCF 1 devices.

A method of installing the novel VDCF devices 1 along with the power and communication cables 50 will now be described in reference to FIGS. 1-10.

Installation Method Steps:

The following installation method steps allow for installation of below grade conduits/ducts and subsequent installation of conductors within that conduit.

1. Excavate the trench for the conduit/duct.
2. Assemble sections of the conduit/duct.
3. Place the assembled conduit/duct into the trench.
4. Backfill and compact the conduit/duct with excavated or select materials as appropriate for local conditions.
5. Pig the conduit to remove debris.
6. Blow in a small pull line.
7. Use the small pull line to pull in a full tension pull rope.
8. Place conductor spools on rollers, one per conductor and one for each compressible volume donator run.
9. Connect all conductors and each compressible volume donator run to the pulling head or full tension pull rope.
10. While slowly pulling the full tension rope, bundle the conductors and compressible volume donating material into an assembly and feed the complete assembly into the throat of the conduit.
11. Conductor lubricants may be used to reduce pulling tension as is typical or as required.
12. Continue pulling the assembly into the conduit/duct until the full tension pull rope and adequate conductors and volume donating material is clear of the installed conduit end with adequate lengths as required for connections.
13. Disconnect the full tension pull rope.
14. Terminate the conductors An exemplary conduit freezing filler calculation is shown below.

Table 1 shows the inside diameter (ID) of several common sizes of Schedule 40 rigid metal conduit. For the following example a 3 inch rigid metal conduit with an ID of 3.068 inches is selected to hold the three 15 kilovolt I/O awg aluminum conductor concentric neutral cables that each have an outside diameter (OD) of 1.125 inches. The ⅝ inch VDCF was selected from Table 2 with an external braided layer. The area of the braided layer is subtracted from the area of the ⅝ inch VDCF to yield an effective compressive area for each VDCF of 0.3068 square inches.

The area of the conduit (ID=3.068") is computed to be 7.3927 square inches. Subtracting the three cables (OD=1.125") having a total area of 2.9821 square inches and the three VDCF (ID=0.699") that have a total area of 1.1505 square inches, yields a remaining potential water area of 3.2601 square inches.

Using the 9.399% expansion coefficient of water on the 3.2601 square inch potential water area yields a required water expansion area of 0.3064 square inches. Using the compressive area for ⅝" VDCF from Table 2 of 0.3068 square inches, each, yields a total compressive area of the three VDCF of 0.9204 square inches. Dividing the water expansion area of 0.3064 square inches by the total VDCF compressive area of 0.9204 square inches yields 0.3329 or 33.29% compression, which is within the recommended 50% compression for this material and will allow for rebound when the ice melts.

| Conduit(Schedule 40 | | Area |
|---|---|---|
| ID" 3.068 | | 7.3927 sq. in. |
| Conductors | | |
| Total | OD" | |
| 3 | 1.125 | 2.9821 sq. in. |
| Filler | | |
| Total | OD" | Compress Area |
| 3 | 0.699" | 1.1505 sq. in. |
| Total Water Area | | 3.2601 sq. in. |
| Ice Expansion Percentage | | 9.399% |
| Ice Expansion Area | | 0.3064 sq. in. |
| VDCF Compression Area 3 x 0.3064 sq.in. | | 0.9204 sq. in. |
| Percent Compression of Filler | | 33.29% (50% maximum) |

TABLE 1

Inside diameter (ID) of several common sizes of Schedule 40 rigid metal conduit.

| Table Size | ID Sched. 40 |
|---|---|
| ½ | 0.622 |
| ¾ | 0.824 |
| 1 | 1.049 |
| 1 & ¼ | 1.380 |
| 1 & ½ | 1.610 |
| 2 | 2.067 |
| 2 & ½ | 2.469 |
| 3 | 3.068 |
| 3 & ½ | 3.548 |
| 4 | 4.026 |
| 5 | 5.047 |
| 6 | 6.065 |

Table 1 shows the different inside diameters of a range of rigid metal conduits. Generally, the larger the cables or an increased number of cables will require a larger conduit. The maximum conduit fill is limited as a result of several factors in the electrical codes.

TABLE 2

Effective Compression Areas (square inches) for ⅝ filler.

| Filler | OD over Braid | Compressible Area |
|---|---|---|
| ⅝ | 0.699" | 0.3068 sq. in. |

The VDCF can be made from a material that is non-conductive, non-water absorbing, compressible and abrasion resistant. The size may vary from large to small depending on the application. As a practical matter the number of VDCF should be limited for ease of installation and the compression should be limited to a level that will allow for ready rebound to the original size upon thawing of the surrounding ice. For the example, three VDCF were installed with a compression of less than 50%.

The number of VDCF sizes may be held to a minimum to help control inventory costs, but can have a diameter that will typically range from approximately ⅜" to approximately 1¼". Alternative Materials for the core filler are described below:

Compressible Core Filler

First Tier Closed Cell Foam:
  NOMACO HBR Closed-cell foam Backer Rod
  DESCRIPTION
  Round, flexible, continuous lengths of extruded, closed-cell Polyethylene foam backer rod for use as a backing material for elastomeric and other cold applied sealants.
  Sizes ⅛", ¼", ⅜", ½", ⅝", ¾" ⅞", 1", 1¼"
  CERAMAR®
  DESCRIPTION
  CERAMAR is a flexible foam expansion joint filler composed of a unique synthetic foam of isomeric polymers in a very small, closed-cell structure. Gray in color, CERAMAR is a lightweight, flexible, highly resilient material offering recovery qualities of over 99%. The compact, closed-cell structure will absorb almost no water.
  Neoprene®
  DESCRIPTION
  Neoprene rubber foam, renowned for its ability to be soft and flexible, but still durable and flexible and reliable. It is highly resistant to many hazards, including ozone, sunlight, and oxidation, as well as many chemicals and water.
Second Tier Materials
  Latex Rubber Based Tubing (Surgical Tubing)
  Latex rubber tubing has many of the required properties, but is limited in its effectiveness as there is only one cell, the void in the inside of the tubing. A single breach of the tubing will compromise the entire installation.

Examples of the Braided Layer are Described Below

The Braided/woven layer are created by braiding together fibers into a tube-like braid. Polypropylene and nylon are the two most common forms of material used.

Examples of the Sealer/Coating are Described Below

The braided/woven layer is run through a bath of a water-based urethane in either a 50% or 100% strength which is impregnated into the outer polyester braid to reduce snagging, provide abrasion resistance and provide the pulling strength necessary during installation.

While the above describes examples of attaching pull lines to the pull ends of the VCDF device 1, other techniques can be used to attach to the ends of the VCDF devices.

A simple knot could be effectively used for short runs and tape can be used for very short runs where the cable could be pushed through the conduit without the need of an eye.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

All numerical values referenced above, can be prefixed by the term "approximately." The term "approximately" is similar to the term "about" and can be +1-10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for preventing freeze damage in power and communication ducts and conduits, comprising:
   at least one volume donating compressible filler (VDCF) device, each VDCF device consisting of at least one elongated cylindrical tubular assembly of closed cell foam within a non-conducting and non-water absorbing outer braided layer that can be sealed to provide longitudinal strength and a snag resistant durable and flexible outer coating, and a pull end, the non-conducting and non-water absorbing outer braided layer being selected from braided nylon and braided polypropylene;
   at least one conductive cable within a sleeve, each cable having a pull end, being placed side by side with each conductive cable within a sleeve; and
   a cable puller for pulling each pull end of each VDCF device and each pull end of each conductive cable within the sleeve through a conduit, that is subject to being damaged by water intrusion which expands during freeze conditions.

2. The system of claim 1, wherein the conduit is a new communication and power conduit to be installed in regions subject to freeze conditions.

3. The system of claim 1, wherein the conduit is an existing communication and power conduit to be retrofitted in regions subject to freeze conditions.

4. The system of claim 1, wherein the conductive cable in the sleeve is selected from a power cable, a communications cable, metal conductors and optical fibers.

5. The system of claim 1, wherein the closed cell foam includes:
   a compressive material.

6. The system of claim 1, wherein the durable and flexible outer coating includes:
   a non-water absorbing material that is abrasion resistant to augment performance of the braided or woven layer and core compressible material.

7. The system of claim 1, wherein the cable puller includes a pulley.

8. The system of claim 1, wherein the outer braided layer of each volume donating compressible filler (VDCF) device is impregnated with a sealer of a water based urethane.

9. A method for preventing damage to communication and power cables during freeze conditions, consisting of the steps of:
   providing a conduit in regions subject to freeze conditions;
   providing at least one volume donating compressible filler (VDCF) device, each VDCF device consisting of an elongated closed cell foam core within a non-conducting and non-water absorbing braided/woven layer that can be sealed to provide longitudinal strength and a snag resistant durable and flexible outer coating, and a pull end, the non-conducting and non-water absorbing outer braided/woven layer being selected from braided nylon and braided polypropylene;
   providing at least one conductive cable within a sleeve, each cable with a pull end;
   positioning each VDCF device placed side by side with each conductive cable within the sleeve within a conduit, so that the pull ends of each VDCF device and each conductive cable within the sleeve are adjacent to one another; and
   pulling the adjacent pull ends of each VDCF device, and the pull ends of each conductive cable within the sleeve through the conduit; and
   reducing volume spacing in the conduit subject to being damaged by water intrusion which expands during freeze conditions.

10. The method of claim 9, further comprising the step of:
    installing a new conduit or retrofitting an existing conduit in northern temperate, sub-arctic and arctic regions.

11. The method of claim 9, wherein the step of:
    providing at least one cable from a power cable, a communications cable, metal conductors and optical fibers.

12. The method of claim 9, further comprising the step
    providing the outer braided layer of each volume donating compressible filler (VDCF) device is impregnated with a sealer of a water based urethane.

13. A system for preventing freeze damage in power and communication ducts and conduits, consisting of a combination of:
    at least one volume donating compressible filler (VDCF) device consisting of at least one elongated cylindrical tubular assembly of closed cell foam within a non-conducting and non-water absorbing outer braided layer that can be sealed to provide longitudinal strength and a snag resistant durable and flexible outer coating, and a pull end, the non-conducting and non-water absorbing outer braided layer being selected from braided nylon and braided polypropylene; and
    at least one conductive cable within a sleeve, each having a pull end, each VDCF device, being placed side by side with each conductive cable within a sleeve,
    wherein a cable puller pulls each pull end of the at least one VDCF device and pulls each pull end of the at least one conductive cable within a sleeve through a conduit that is subject to being damaged by water intrusion which expands during freeze conditions.

14. The system of claim 13, wherein the outer braided layer of each volume donating compressible filler (VDCF) device is impregnated with a sealer of a water based urethane.

* * * * *